(12) United States Patent
Witchey

(10) Patent No.: US 6,705,135 B2
(45) Date of Patent: Mar. 16, 2004

(54) EXCAVATOR LOCK

(76) Inventor: Bryan Witchey, 209 Fairway Cir., Cross Junction, VA (US) 22625

( * ) Notice: Subject to any disclaimer, the term of this patent is extended or adjusted under 35 U.S.C. 154(b) by 0 days.

(21) Appl. No.: 10/384,634

(22) Filed: Mar. 11, 2003

(65) Prior Publication Data

US 2003/0167807 A1 Sep. 11, 2003

Related U.S. Application Data

(60) Provisional application No. 60/363,274, filed on Mar. 11, 2002.

(51) Int. Cl.$^7$ .................................................. G05G 5/00
(52) U.S. Cl. .............................. 70/199; 70/238; 70/247
(58) Field of Search ................... 70/198–203, 237–239, 70/245–248, 254

(56) References Cited

U.S. PATENT DOCUMENTS

| | | | |
|---|---|---|---|
| 1,165,776 A | * | 12/1915 | Harding et al. |
| 1,179,275 A | * | 4/1916 | Bruehne |
| 1,382,431 A | * | 6/1921 | Lang |
| 1,386,543 A | * | 8/1921 | Tiller |
| 1,402,955 A | * | 1/1922 | Pohl |
| 1,475,863 A | * | 11/1923 | Pate |
| 1,579,395 A | * | 4/1926 | Rohm et al. |
| 1,593,815 A | * | 7/1926 | Aasen |
| 1,599,896 A | * | 9/1926 | Kakuske |
| 4,030,323 A | * | 6/1977 | Stanislawczyk ............... 70/199 |
| 4,222,287 A | * | 9/1980 | Drone et al. ................... 74/529 |
| 4,653,296 A | | 3/1987 | Kajikawa ...................... 70/185 |
| 5,042,754 A | | 8/1991 | Heath .......................... 244/224 |
| 5,325,733 A | * | 7/1994 | Papasideris et al. ....... 70/199 X |
| 5,347,835 A | | 9/1994 | Dewey ......................... 70/202 |
| 5,359,868 A | | 11/1994 | Villani ......................... 70/203 |
| 5,613,382 A | * | 3/1997 | Uter ............................. 70/199 |
| 5,829,282 A | | 11/1998 | Surridge ...................... 70/201 |
| 5,906,121 A | | 5/1999 | Mankarious ................. 70/199 |
| 5,911,391 A | | 6/1999 | Russ et al. ................... 244/224 |
| 5,953,941 A | | 9/1999 | Freund ......................... 70/199 |
| 6,116,065 A | | 9/2000 | Hale ............................ 70/200 |

FOREIGN PATENT DOCUMENTS

FR 625760 * 8/1927 .................. 70/199

* cited by examiner

Primary Examiner—Lloyd A. Gall
(74) Attorney, Agent, or Firm—Richard C. Litman

(57) ABSTRACT

An excavator lock adapted to limit the motion of a pair of control levers such as a forward and reverse drive control levers of a mechanical excavator thereby preventing the theft of a mechanical excavator. The excavator lock comprises a main body and a locking plate. The main body has a first and second channels adapted to accommodate a first and second control levers of a mechanical excavator. The locking plate is adapted to cover the first and second channels. A locking mechanism attached to the main body actively engages with the locking plate to temporarily lock the main body to the lock plate thereby providing an excavator lock for limiting the motion of a first and second control levers of a mechanical excavator to inhibit theft of the mechanical excavator.

6 Claims, 5 Drawing Sheets

EXCAVATOR LOCK

CROSS-REFERENCE TO RELATED APPLICATION

This application claims the benefit of U.S. Provisional Patent Application Serial No. 60/363,274, filed Mar. 11, 2002.

BACKGROUND OF THE INVENTION

1. Field of the Invention

The present invention relates generally to anti-theft devices for vehicles. More specifically, the invention is an anti-theft device to prevent unauthorized control and use of a mechanical excavator.

2. Description of the Related Art

The related art of interest describes various locking devices, but none discloses the present invention. There is a need for a locking device that prevents the theft of a mechanical excavator even if a thief has an ignition key to start up the excavator's engine.

Excavators are vulnerable to misuse and theft, particularly at night when excavators are often left unattended on construction sites. Thieves often have little difficulty in illicitly starting up an unattended mechanical excavator with or without an engine ignition key. Once a mechanical excavator's engine is running the excavator may be driven onto a trailer or flat bed truck and stolen. Such thefts lead to higher insurance premiums which inevitably translate into higher construction costs.

Several efforts have been made to address these problems. U.S. Pat. No. 4,653,296 issued Mar. 31, 1987 to T. Kajikawa describes a handle locking mechanism for vehicles. The '296 device is adapted to secure a steering shaft operably connected to a pair of bike like handles. Whatever the merits of the '296 patent there is no teaching or suggestion of a device to prevent theft of a mechanical excavator.

U.S. Pat. No. 5,042,754 issued Aug. 27, 1991 to R. Heath describes a device for securing the throttle control levers of an aircraft in their closed position. The '754 device is useful in preventing vertical motion of the aircrafts key controls thus preventing the aircraft from leaving the ground. The '754 patent does not teach or suggest a device to prevent theft of a mechanical excavator.

U.S. Pat. No. 5,347,835 issued Sep. 20, 1994 to D. L. Dewey describes a device for locking a control lever, such as a clutch control lever, on a handlebar of a vehicle such as a motor cycle. Whatever the merits of the '835 device it is not adapted to securing the forward and reverse control levers of a mechanical excavator which are very different from those of a vehicle with handlebars. Specifically, the '835 patent does not teach or suggest a device that locks the forward and reverse control levers of a mechanical excavator.

U.S. Pat. No. 5,359,868 issued Nov. 1, 1994 to F. L. Villani describes several devices including a device for preventing the movement of a floor-mounted gear shift lever of an automobile, and a gas pedal lock. Whatever the merits of the '868 patent it does not teach or suggest an apparatus or method for securing the control levers of a mechanical excavator which are very different from those of an automobile. Specifically, the '868 does not teach or suggest a device that locks the forward and reverse control levers of a mechanical excavator.

U.S. Pat. No. 5,829,282 issued Nov. 3, 1998 to D. G. Surridge describes a control lever lock assembly for preventing accidental activation of a coupling apparatus for controlling the coupling and decoupling of a tool attached to work machines such as a wheel loader. The '282 device is not designed to prevent the theft of the work vehicle.

U.S. Pat. Nos. 5,911,391, 5,953,941, and 6,116,065 each describe an apparatus for locking aircraft controls and the like; and U.S. Pat. No. 5,906,121 describes a pedal lock for vehicles. The '391, '941, '065, and '121 patents do not teach or suggest a device that locks the forward and reverse control levers of a mechanical excavator.

None of the above inventions and patents, taken either singularly or in combination, is seen to describe the instant invention as claimed. Thus, an excavator lock solving the aforementioned problems is desired.

SUMMARY OF THE INVENTION

The present invention is an excavator lock adapted to limit the motion of a pair of control levers such as the forward and reverse drive control levers of a mechanical excavator thereby preventing the theft of a mechanical excavator. The excavator lock comprises a main body and a locking plate. The main body has a first and second channels adapted to accommodate a first and second control levers of a mechanical excavator. The locking plate is adapted to cover the first and second channels. A locking mechanism attached to the main body actively engages with the locking plate to temporarily lock the main body to the lock plate thereby providing an excavator lock for limiting the motion of a first and second control levers of a mechanical excavator to inhibit theft of the mechanical excavator. Accordingly, it is a principal object of the invention to provide a device to prevent the theft of a mechanical excavator.

It is a further object of the invention to provide an excavator lock which limits the relative motion of the forward and reverse drive control levers of a mechanical excavator to thereby prevent the theft of the vehicle.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to an excavator lock to help prevent theft of a mechanical excavator. More specifically, the excavator lock of the invention limits the motion of two control levers, e.g. a forward and reverse drive levers, thereby preventing the theft of the mechanical excavator.

Figure 2A:
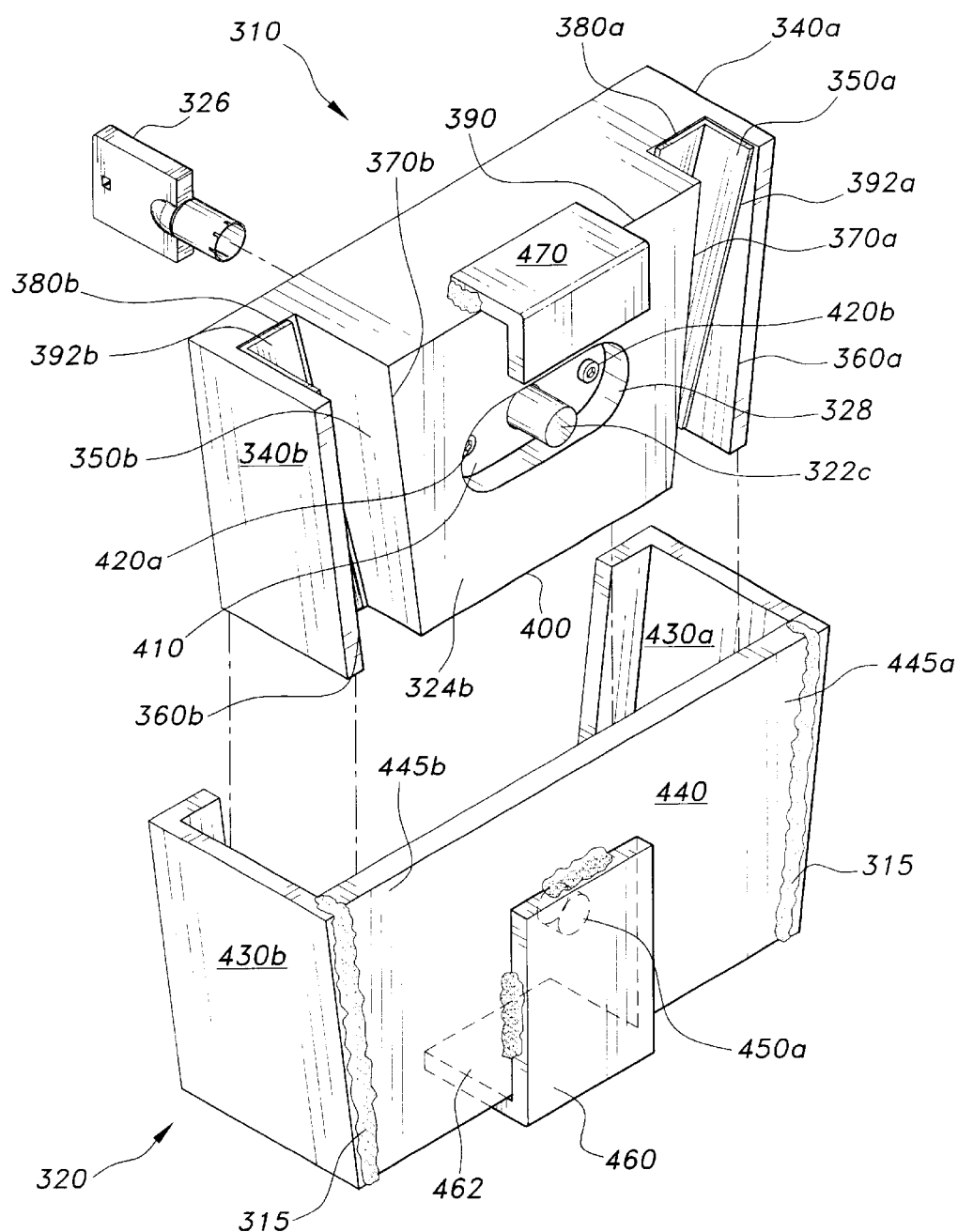
FIG. 2A shows a perspective view of a main body member with generally rectangular channels, and a lock plate member according to one embodiment of the excavator lock of the present invention.

Referring to the figures in general, the excavator lock is denoted by the reference numeral 300 as a whole. The excavator lock 300 comprises two parts, a main body 310 and a lock plate 320. The main body 310 reversibly mates with the larger lock plate 320 as shown in FIG. 2A. The main body 310 and lock plate 320 are preferably made of steel, but any material of high durability may be used.

Figure 1:
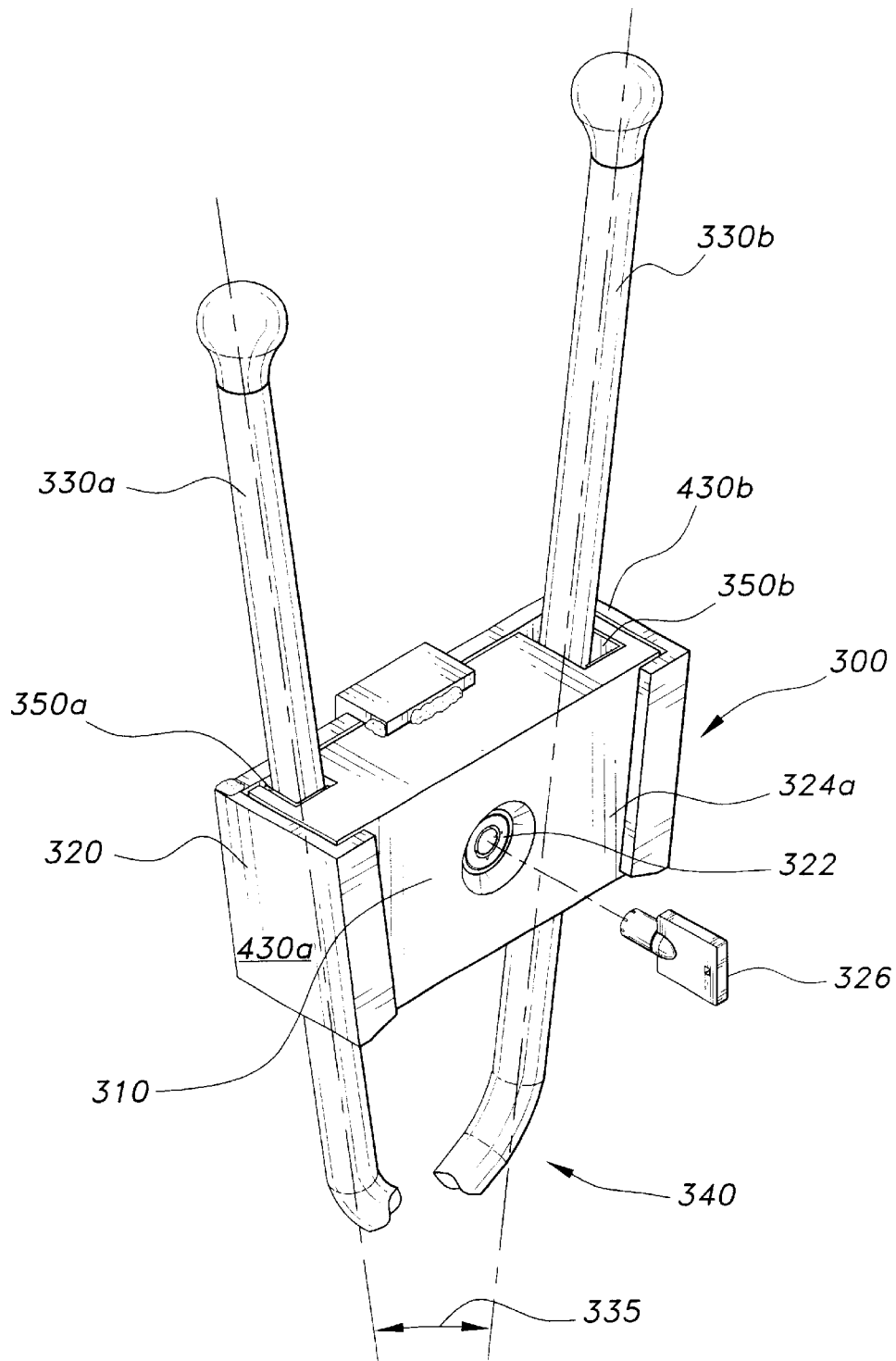
FIG. 1 is a perspective environmental view of an excavator lock according to the invention.

FIG. 1 shows an environmental perspective view of the excavator lock 300. The excavator lock 300 is attached to, and thereby immobilizing, a first control lever 330*a* and a second control lever 330*b*. The levers 330*a* and 330*b*, which are shown for illustrative purposes only and are not intended to limit the scope of the present invention; the excavator lock 300 of the present invention can be used to immobilize any pair of control levers that align in the manner shown in FIG. 1 with regard to current and future mechanical excavators. In addition, it should be understood that the excavator lock 300 can be fitted to the illustrated levers so that the levers 330*a* and 330*b* are clamped in channels 350*a* and 350*b*, respectively.

It is well known in the art of handling mechanical excavators that the control levers 330*a* and 330*b* are pivotally attached to an excavator (not shown). When the control levers 330*a* and 330*b* are generally aligned as shown in FIG. 1, they adopt a generally converging angle 335. As will become clear below, the excavator lock 300 is adapted to accommodate the convergence angle 335 of the control levers 330*a* and 330*b*.

Figure 2B:
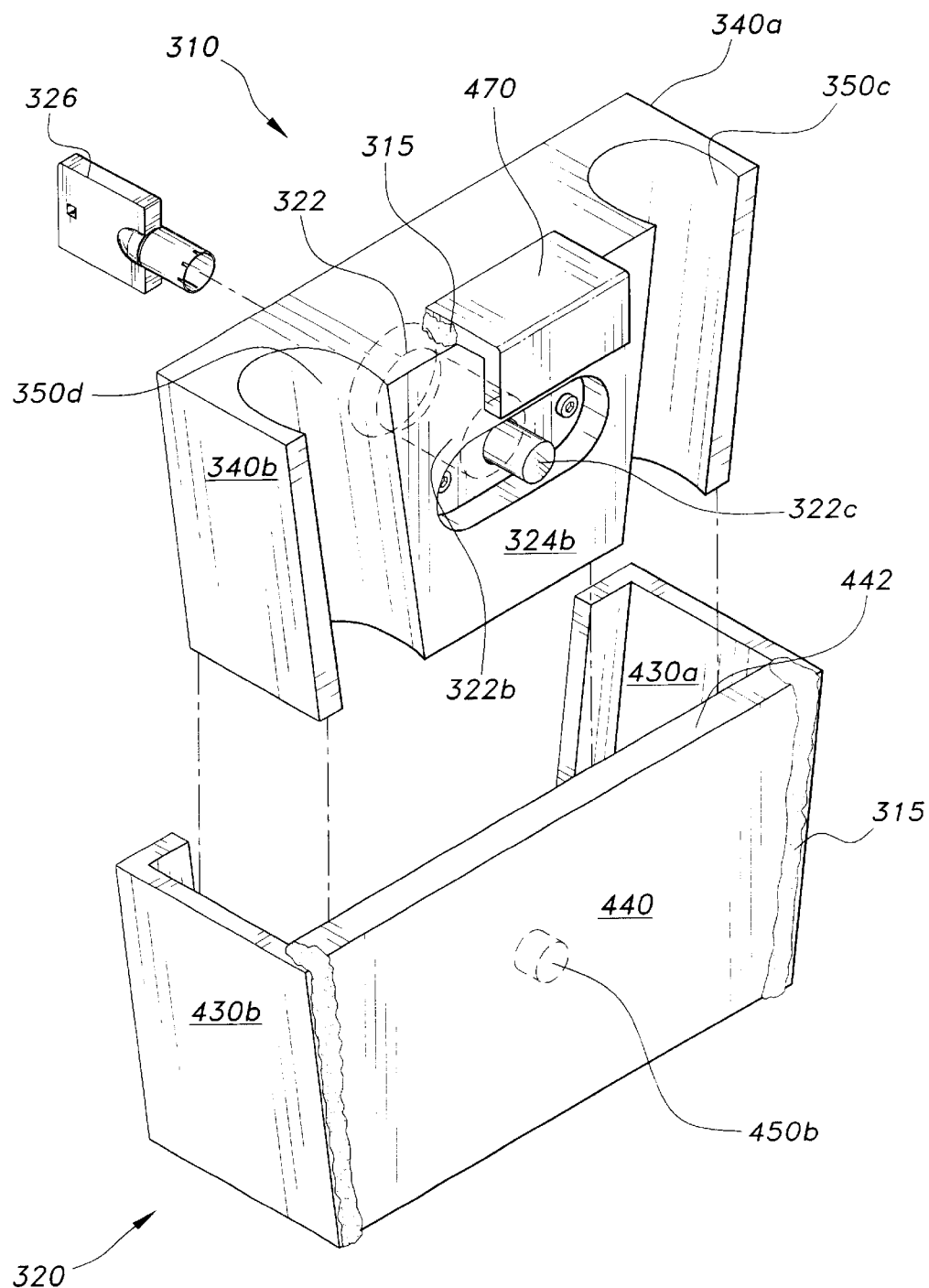
FIG. 2B is a perspective view of an excavator lock with channels of generally semi-circular cross section.

Referring to FIGS. 2A and 2B, a lock mechanism 322 is shown installed in an external face 324*a* of the main body 310. The lock mechanism 322 comprises a stock 322*b* (shown in phantom in FIG. 2B) terminating in a lock-bolt 322*c* which emerges from the interior face 324*b*. An optional recessed section 328 is shown in the inner face 324*b* of the main body 310. The lock mechanism 322 is preferably a spring biased lock and preferably adapted to function with a pick resistant key 326. It should be understood that the lock mechanism 322 may vary and take any suitable form and may incorporate, for example, a keyless combination lock in cooperative communication with a lock-bolt 322*c*; therefore, the lock mechanism 322 is shown for illustrative purposes only and should not be viewed as limiting the present invention in any way.

With respect to FIG. 2A, the interior of the main body 310 comprises opposite ends 340*a* and 340*b* respectively defining converging channels 350*a* and 350*b*; the channels 350*a* and 350*b* are of generally rectangular cross-section. The channel 350*a* comprises parallel outer 360*a* and inner 370*a* sides, and a rear facing side 380*a*. The channel 350*b* comprises parallel outer 360*b* and inner 370*b* sides and a rear facing side 380*b*. Optional spacers 392*a* and 392*b* may be fitted, as shown, as optional liners respectively in converging channels 350*a* and 350*b*.

Referring to both FIGS. 2A and 2B, the main body 310 further comprises an interior face 324*b* of generally trapezoidal shape defined by converging sides 370*a* and 370*b*, and opposite parallel sides 390 and 400, wherein side 390 has a greater length than side 400. Since sides 370*a* and 370*b* are converging it follows that the channels 350*a* and 350*b* must also be converging at an angle 335 (see FIG. 1).

It will be understood that the magnitude of the converging angle 335 may vary according to the degree of convergence of pairs of levers 330*a* and 330*b* found in excavator trucks. It should also be understood that while it is preferred that the lock plate 320 has a lengthwise trapezoidal shape, the lock plate 320 can be rectangular in shape or any other shape providing that the lock plate 320 covers the channels 350*a* and 350*b* in order to immobilize the controlling levers 330*a* and 330*b*.

A plate 410, which forms part of the lock mechanism 322, is set into the recessed section 328. The plate 410 is fastened to the main body 310 by fasteners such as security hex screws 420*a* and 420*b*. Depressing the lock mechanism 322 inward causes the lock-bolt 322*c* to emerge through a hole defined in the plate 410 and emerge from the recessed section 328 to engage a blind hole 450*a* in the lock plate 320 to reversibly prevent the main body 310 moving relative to the lock plate 320. It should be understood that the terms "reversible" and "reversibly" are intended to mean that the action can be reversed, e.g., by manipulating the position of the lock-bolt 322*c* with respect to the blind hole 450*a* (or 450*b*, see FIG. 2B and explanation below) the main body 310 can be repeatedly locked to and unlocked with respect to the lock-plate 320.

The lock plate 320 comprises opposite L-shaped ends 430*a* and 430*b* and a back-plate 440; the L-shaped ends 430*a* and 430*b* are preferably attached by welds 315 to the back-plate 440. The blind hole 450*a* comprises a hole drilled through the back-plate 440 and a portion of an L-shaped bracket 460 which covers the hole in the back-plate 440 to provide the blind hole 450*a*. The L-shaped bracket 460 serves to prevent a putative thief from interfering with the lock-bolt 322*c*. In addition, one end 462 of the L-shaped bracket 460 acts as a stop when the main body 310 reversibly mates with the lock plate 320. An optional stop 470 may be attached to the main body 310 to stop against a top ledge 442 of the back-plate 440.

In use, an operator (such as an excavator driver or owner) aligns the control levers of interest as represented herein by levers 330*a* and 330*b* and maneuverers them into the channels 350*a* and 350*b* of the main body 310. The locking plate 320 is maneuvered until the L-shaped ends 430*a* and 430*b* are wrapped around the levers 330*a* and 330*b* at a position just below the main body 310, and the locking plate 320 is lifted up to reversibly mate with the main body 310; a reversibly mated (i.e. docked) main body 310 and lock plate 320 is shown in FIG. 2B. The locking mechanism 322 is operated to cause the lock-bolt 322*c* to engage the blind hole 450*a* thus locking the main body 310 to the lock plate 320 whereby the levers 330*a* and 330*b* are immobilized in channels 350*a* and 350*b* thereby inhibiting the theft of an excavator. To release the excavator lock 310 from the locking plate 320 the locking mechanism 322 is operated to retract the lock-bolt 322*c* from the blind hole 450*a* thereby freeing the main body 310 which can be moved from the lock plate 320 to expose the channels 350*a* and 350*b* to free the levers 330*a* and 330*b*. It will be understood that an operator could use the excavator lock 300 in a variety of ways to immobilize and release the levers 330*a* and 330*b*.

Figure 3A:
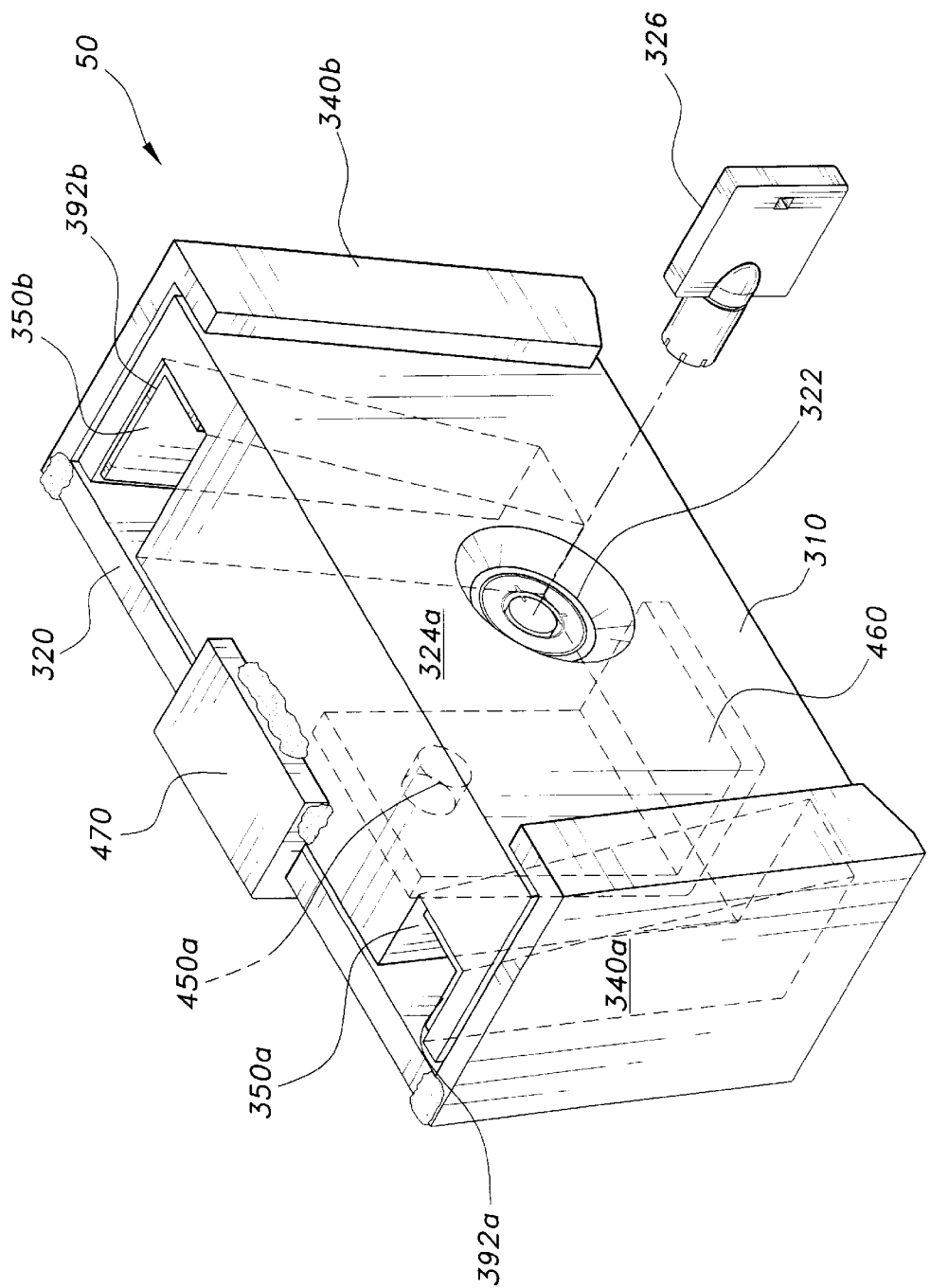
FIG. 3A shows a perspective view of a main body member with generally rectangular channels coupled to a locking plate.
Figure 3B:
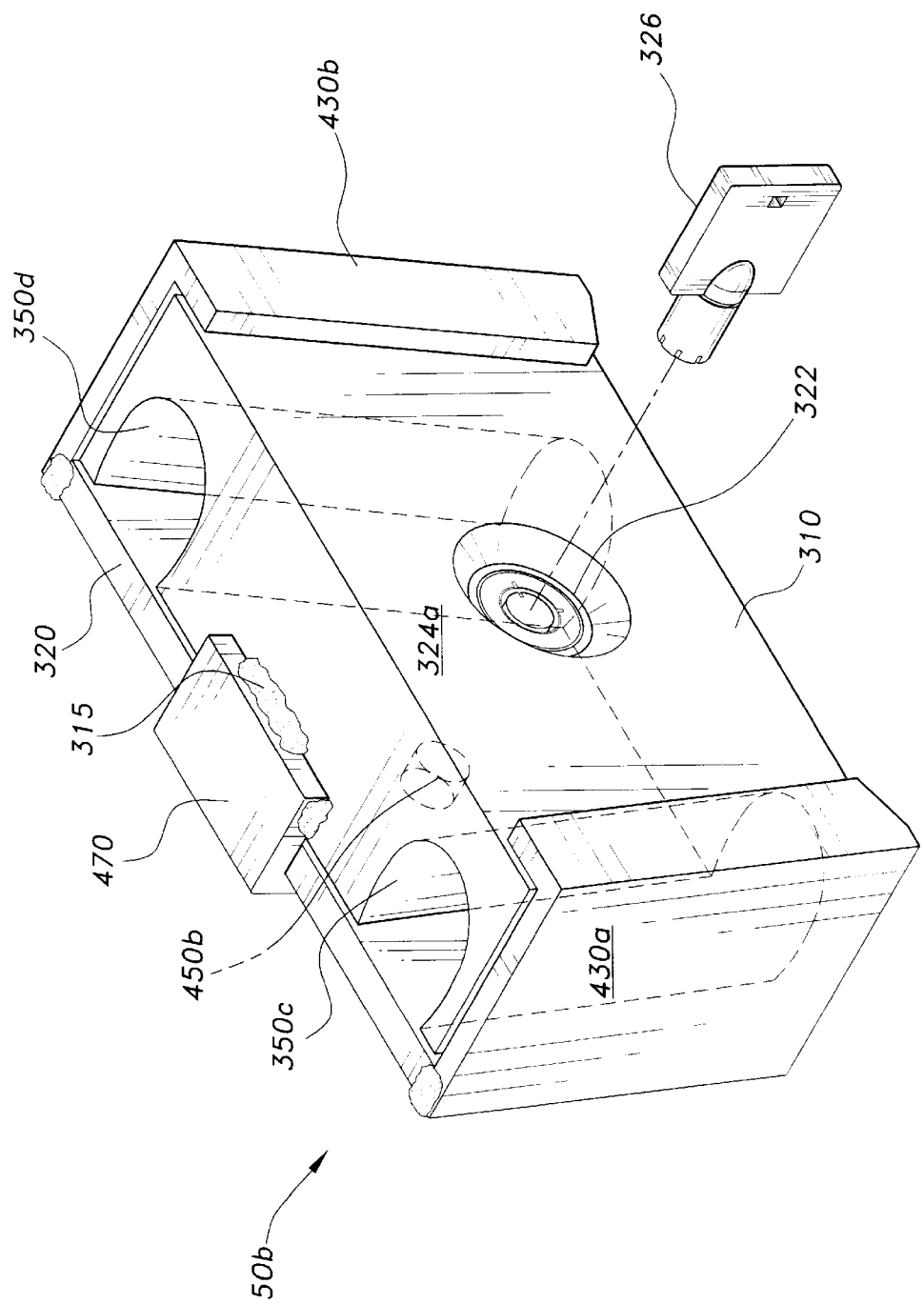
FIG. 3B shows a perspective view of a main body member with channels of generally semi-circular cross section coupled to a locking plate.

Referring to FIGS. 3A and 3B, a further embodiment of the excavator lock 300 is shown comprising channels 350*c* and 350*d*, which are adapted to accommodate the control levers 330*a* and 330*b*. The channels 350*c* and 350*d* are generally of semi-circular cross section in contrast to the channels 350*a* and 350*b* which were generally of rectangular cross section. The channels may be of any other suitable cross section shape that can accommodate the stems of the control levers 330*a* and 330*b*.

Referring to FIGS. 2B and 3B, the blind hole 450*b* partly penetrates the back-plate 440 thereby rendering redundant the L-shaped bracket 460. The optional stop 470 acts as a stop against the lock plate 320, and more particularly the ledge 442 of the back-plate 440. It should be understood that the stop functions of the L-shaped brackets 460 and 470 are optional, i.e. they may be left out, because they are not essential for the working of the excavator lock 300 according to the present invention. The invention includes other permutations that might be found in U.S. Provisional Patent Application Serial No. 60/363,274. U.S. Provisional Patent Application Serial No. 60/363,274 is incorporated herein by reference in its entirety.

It is to be understood that the present invention is not limited to the embodiments described above, but encompasses any and all embodiments within the scope of the following claims.

I claim:

1. An excavator lock to limit the motion of a forward and reverse drive control levers of a mechanical excavator thereby preventing the theft of a mechanical excavator, comprising:

a main body having a first and second opposite ends respectively defining a first and second channel adapted to respectively accommodate a first and a second control levers of a mechanical excavator;

a lock plate having a first and second opposite L-shaped ends and a back-plate, wherein the back-plate has a blind-hole and is adapted to cover the first and second channels, wherein the first and second opposite L-shaped ends are adapted to respectively wrap around the first and second opposite ends of the main body; and a locking mechanism attached to the main body and adapted to reversibly engage with the blind-hole, whereby the locking mechanism works cooperatively with the L-shaped ends to reversibly lock the main body to the lock plate, whereby the excavator lock can limit the motion of a first and a second control levers of a mechanical excavator thereby inhibiting the theft thereof.

2. An excavator lock as in claim 1, wherein the locking mechanism comprises a stock and a lock-bolt.

3. An excavator lock as in claim 1, wherein the main body has a trapezoidal shape.

4. An excavator lock as in claim 1, wherein the first and second channels adopt a generally converging angle.

5. An excavator lock as in claim 1, wherein the first and second channels have a rectangular cross section.

6. An excavator lock as in claim 1, wherein the first and second channels have a semi-circular cross section.

* * * * *